METHOD OF FORMING GAPS FOR SMALL MAGNETIC HEADS

CROSS-REFERENCES

The following commonly assigned applications are all pertinent to the subject matter hereof:

Ser. No 149,974, filed June 4, 1971, "Skewed High Density Magnetic Head and Method of Manufacturing Same," by G. Taylor;

Ser. No. 149,975, filed June 4, 1971, "Batch Fabricated Magnetic Head Tester and Testing Method," by S. M. Barrager and S. H. Smith; and Ser. No. 149,976, filed June 4, 1971, "Improved Batch Fabricated Magnetic Head Tester and Testing Method," by S. M. Barrager, G. Bate, and S. H. Smith.

BACKGROUND OF THE INVENTION

1. Field of the Invention

The invention generally relates to electrical data processing and, more particularly, to a method of making magnetic recording heads.

2. Description of the Prior Art

The formation of small apertures and narrow gaps, on the order of 100 microinches in ductile materials, about 1,000 microinches thick, presents the possibilities of inaccuracy, unpredictable magnetic and electrical effects, etc. Tools available in the prior art are generally inapplicable to this problem because they create undesirable stresses, inaccuracies, burrs, etc. Another prior art approach to the aperture and gap-cutting problem has been to apply an acid-resistant mask to the strip, lightly punch the aperture and scribe the gap, and then acid-etch the strip to the final desired dimension. Accurate aperture and gap formation is, however, not possible because surface-applied acid cannot attack the strip uniformly throughout its thickness.

SUMMARY OF THE INVENTION

Accuracy and stress-elimination are achieved by forming the gaps throughout the head thickness in one step. In one embodiment, an etchant forms the aperture and gap throughout the entire strip thickness simultaneously. The strip is first coated with a mask, the aperture is punched through the strip (lightly to a rough size) and the gas is sheared. Then the strip is etched to form the final aperture and gap dimensions and remove deformed edges. The gap shearing may be accomplished by scissoring or punching gaps. In scissoring, inter-gap sections are curved, whereas, they are substantially straight when punched. In another embodiment, the "gap" originates as a non-magnetic layer on a magnetic strip of foil or wire. When the strip is wound on a mandrel, on layer for each gap, each sandwiched conductive layer defines a gap. The wound strip is subsequently separated into head elements by cutting slices out of its cross-section. The apertures are formed by appropriate machining techniques.

The foregoing and other features and advantages of the invention will be apparent from the following more particular description of preferred embodiments of the invention, as illustrated in the accompanying drawings.

BRIEF DESCRIPTION OF DRAWINGS

FIGS. 5A through 5C show several techniques for forming gaps in magnetic read/write head elements of the type shown in FIG. 3B.

DETAILED DESCRIPTION OF THE INVENTION

A transducer records information as magnetic areas on a medium by translating electrical signals into magnetic fields. The same transducer may also detect magnetic areas on a medium and translate them into electrical signals. Such transducers, commonly called magnetic read/write heads, usually operate by sensing the change in flux of a magnetic medium moving past the transducer. It is not essential that the medium move past the head, it being possible to move the head—the only requirement is that there be relative motion between the medium and the transducer to gain access to successive bits. A high bit density is considered to be 10,000 flux changes per inch (fci) and a high track density is considered to be between 500 and 2,000 tracks per inch at a high data rate of approximately 2.5 megahertz (MHz).

Figure 1:
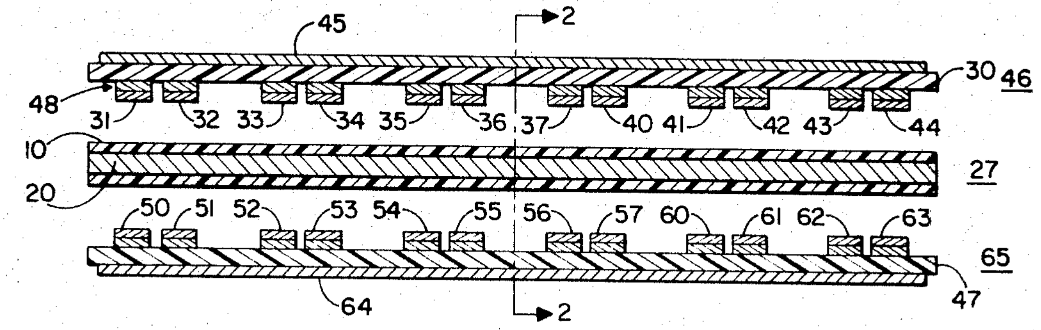
FIG. 1A shows a read/write head assembly for reading and writing information stored on a magnetic tape medium.
FIG. 1B shows another embodiment of a read/write head assembly for reading and writing information stored on a magnetic tape medium.
FIG. 1C shows a read/write head assembly for reading and writing information stored on a magnetic disk medium.
Figure 2:
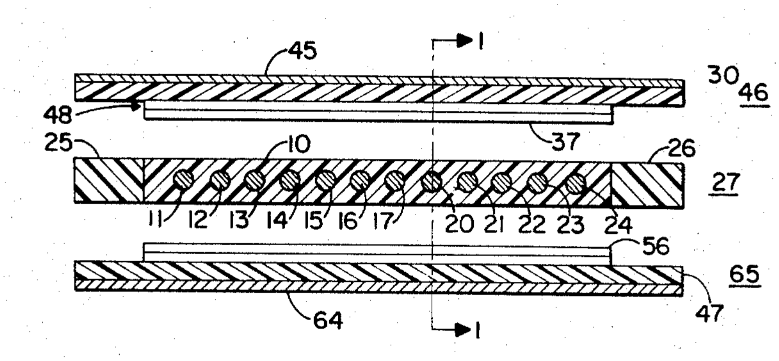
FIGS. 2A through 2E diagrammatically show the tracks on which information may be recorded by a read/write head positioned at varying angles relative to a medium.
Figure 3:
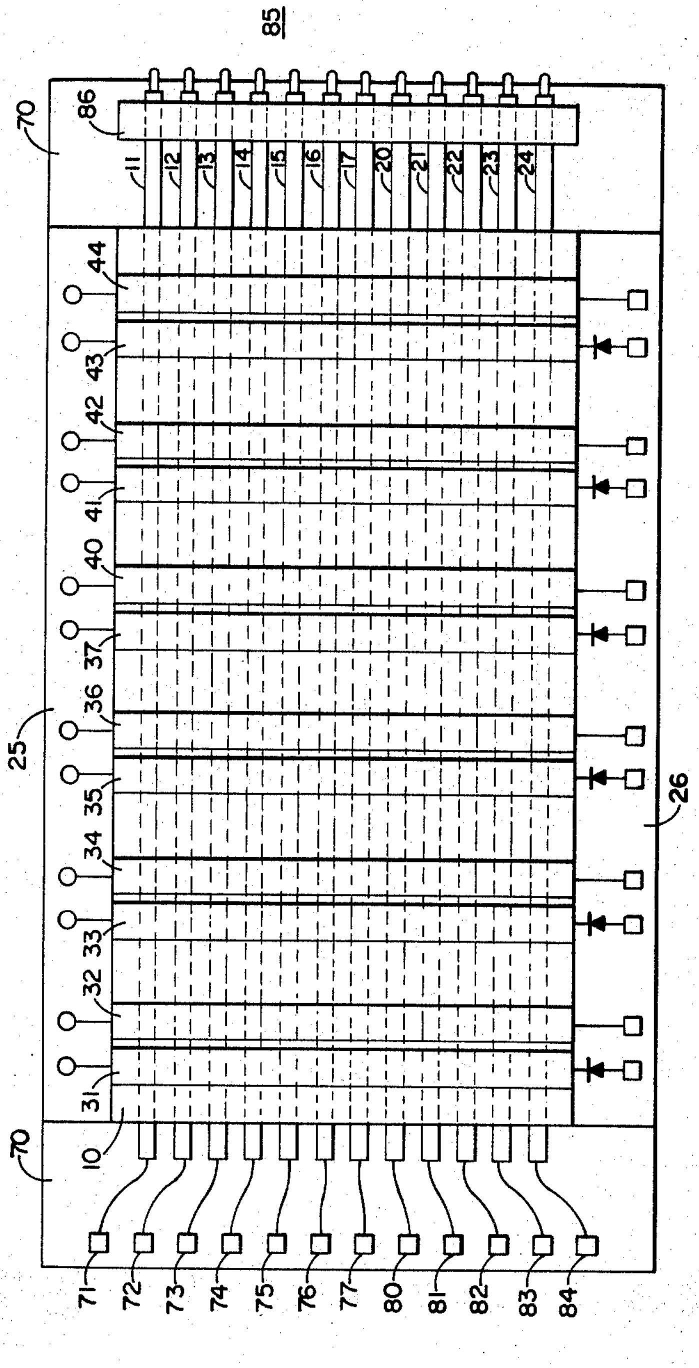
FIGS. 3A through 3C show various configurations of batch fabricated magnetic read/write head elements.

Magnetic Head Structure (FIGS. 1–3)

In order to obtain the desired high bit density, high track density and high data rate, it is desirable to operate the magnetic read/write head in a semitransverse mode. That is, the head is not necessarily mounted perpendicular to the relative motion between the head and the media. Referring first to FIG. 1A, there is shown a magnetic read/write head assembly 100 (for simplicity referred to as a magnetic head) mounted at an angle $\theta$ relative to a line across a magnetic tape 101. The magnetic head 100 is a transducer element 103 comprising a plurality of gaps each corresponding to a track 102 on the tape 101. As will be explained, the transducer element is a batch-fabricated thin film, foil strip or sheet, wherein each gap is defined by a slot, fastened between subassemblies 104 and 105 by fasteners 108 and 109 placed through fastening holes 106 and 107. As shown in more detail with reference to FIGS. 2A through 2E, the angle $\theta$ determines the number of tracks 102 which may be recorded on the magnetic tape 101 and the spacing and width of these tracks.

INVENTORS
JACK L. GRANATO
RICHARD F. MOORE
BY Charles J. Ungemach
ATTORNEY

INVENTORS
JACK L. GRANATO
RICHARD F. MOORE
BY Charles J. Ungemach
ATTORNEY

INVENTORS
JACK L. GRANATO
RICHARD F. MOORE
BY Charles J. Ungemach
ATTORNEY

PLATED WIRE MEMORY FABRICATION

BACKGROUND OF THE INVENTION

This is a Divisional Application arising out of a prior copending application, Ser. No. 688,782, filed Dec. 7, 1967, by the same applicants.

The invention herein described was made in the course of or under a contract or subcontract thereunder, with the Department of the Navy, viz., contract No. ILH 222311 under prime contract No. N00030-66-C-0189.

One of the most outstanding advances in the computer memory art is the development of coincident current write, NDRO read plated wire memories. The basic element in the memory is a substrate of 0.005 inch diameter conductive wire coated with a thin film of magnetically active material. The magnetically active material is electrodeposited on the wire substrate by a controlled deposition process. One of the properties of the plated wire is that the magnetic material has a preferred direction of magnetization. It is generally preferred that this preferred or "easy" direction of magnetization be circumferential so that a closed flux path magnetic field can be oriented either clockwise or counter clockwise around the wire. Thus, binary information can be stored by defining one direction of magnetization, such as clockwise, as a binary "1" and the other direction of magnetization, such as counter clockwise, as a binary "0". The substrate wire is generally used as a sense line during read operations and as a bit wire during write operations. An array of word straps is wrapped around the plated wire. These word straps are generally used as interrogate lines during read operations and as selection lines during write operations. An article by I. Danylchuk, A. J. Perneski, and M. W. Sagal, "Plated Wire Magnetic Film Memories," 1964 Proceedings of Intermag Conference (International Conference on Nonlinear Magnetics), Washington, April 6–8, 1964, page 5-4-1 to 5-4-6 gives a general description of the operation and structure of plated wire memories.

One of the major problems with plated wire memories is that the wires must be held a sufficient distance apart to prevent cross coupling between adjacent wires and to prevent stray signals from being generated. Due to the characteristics of thin magnetic films, the wires must also be held loosely. If the wire is placed under tension, the information stored along the wire may be destroyed due to self-demagnetization. Also, the word straps must be in close proximity to the plated wires so that there is sufficient coupling between word straps and the plated wires to properly operate the memory.

SUMMARY OF THE INVENTION

In this invention, the plated wire is placed in a "tunnel structure" wherein the plated wires are held parallel and evenly spaced, yet are not held rigidly. The word straps are then placed over the tunnel structure. The word straps can be formed by plating or depositing conductive material on printed circuit boards or substrates and then sandwiching the tunnel structure between the printed circuit boards to create a multilayer printed circuit.

Accordingly, it is an object of this invention to provide a new and unique method of fabricating plated wire memory assembly.

This object and other objects and advantages of this invention will become evident to those skilled in the art upon a reading of this specification and the appended claims in conjunction with the drawings.

BRIEF DESCRIPTION OF THE DRAWINGS

Figures 4, 5, 6:
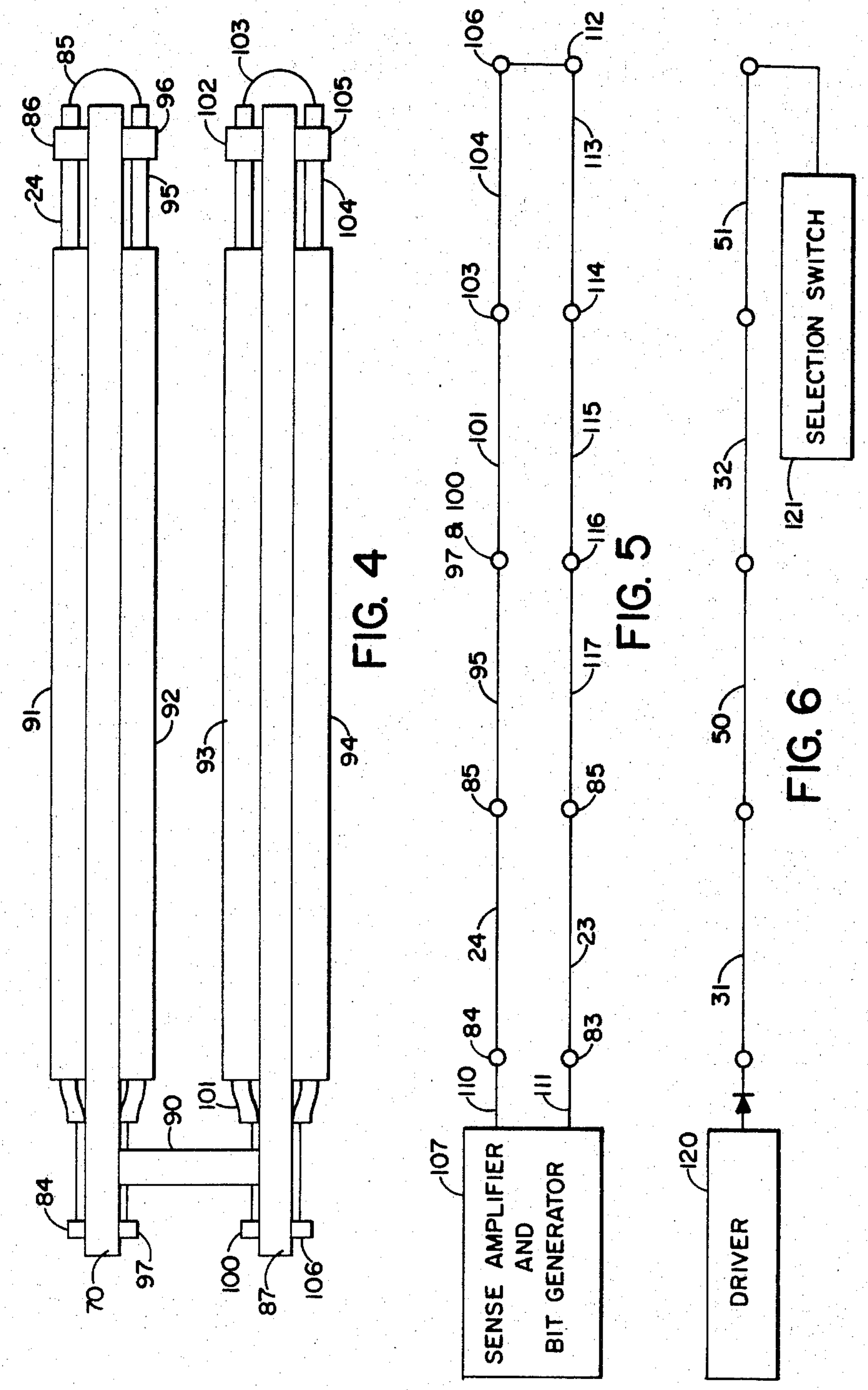
FIG. 4 is a detailed view showing construction of one embodiment of FIG. 3B.
FIG. 6 shows an alternative technique for manufacturing the magnetic read/write head element of FIG. 3B.

FIG. 1 is an exploded cross section of one layer of the memory taken along a plated wire;

FIG. 2 is an exploded cross sectional view taken in a direction perpendicular to FIG. 1;

FIG. 3 is a top view of a memory plane;

FIG. 4 is a side view of four memory layers arranged in a memory stack;

FIG. 5 is a schematic wiring diagram of the plated wires; and

FIG. 6 is a schematic wiring diagram of the sense lines.

DETAILED DESCRIPTION OF THE INVENTION

FIGS. 1 and 2 show cross sectional views of the invention. FIG. 1 is a cross section taken along the axis of a plated wire (along line 1—1 of FIG. 2) and FIG. 2 is a cross section taken perpendicular to the axis of the wires (along line 2—2 of FIG. 1). The central portion of the invention is a carrier, substrate, "tunnel structure", or a sheet of semi-rigid material 10. Any suitable plastic material can be used provided it is an electrical insulator transparent to magnetic fields, and it must be semi-rigid. A material such as Teflon has been found to be satisfactory. The tunnel structure 10 is formed with passages or holes through it. Plated wires 11–17 and 20–24 are inserted into the passages. Wire 20 is shown in cross section in FIG. 1. The plated wires can be of any construction desired, but it is preferred that such wires have a diameter of approximately 0.005 inches. The holes or passages in the tunnel structure 10 should have a diameter of approximately 0.0075 inches so that the plated wires are free to move relative to the tunnel structure 10. Freedom of movement is essential since the thin magnetically active film plate onto the wire substrate is quite sensitive to mechanical stresses and changes characteristics drastically with changes in mechanical stresses. For example, mechanical stresses may cause the magnetic material plated on the wire to demagnetize thereby destroying the information stored on the wire. Accordingly, it is also essential that the tunnel structure 10 be sufficiently rigid so that it does not deform and bind the plated wire. From these comments it is evident that any material can be used for tunnel structure 10, but that such material must be sufficiently rigid to prevent binding of the plated wires when they are inserted in holes through the material. In addition, the material must be transparent to magnetic fields so that the magnetic fields established around word straps can penetrate through the material and couple the magnetic material plated on the wires.

One satisfactory method of making the tunnel structure and plated wire assembly is to place ordinary wires on a thin sheet of plastic material and laminate another thin sheet of plastic material over the wires. Then the wires are extracted from the plastic and replaced by plated wires. A 0.01 inch thick tunnel structure has been found to be satisfactory.

The tunnel structure and plated wire assembly is next placed between two insulating boards 25 and 26 which may be of a material such as glass epoxy. This assembly comprises one layer 27 of a multi-layer printed circuit assembly.

A circuit board or plastic sheet 30 has word straps 31–37 and 40–44 placed thereon. A magnetic keeper layer 48 is placed between the word straps and circuit board 30. The purpose of the magnetic keeper is to provide a high permeability (low reluctance) magnetic path around part of the word straps similar to that shown in a patent to J. W. Luebbe, Jr. U.S. Pat. No. 3,235,853. One method of forming this structure is as follows. A sheet or layer of Permalloy is placed on a sheet 30 of glass epoxy or similar material approximately 0.004 inches thick. The layer of Permalloy can be approximately 0.001 inches thick. Next, word straps 31–37 and 40–44 are printed onto the Permalloy using standard printing techniques. A satisfactory material for the word straps is copper. The word straps can be approximately 0.001 by 0.015 inches. Next, a very thin layer of gold is placed over the copper word straps and the Permalloy is etched. The gold inhibits etching of the plated copper so that a Permalloy keeper is formed between each word strap and circuit board 30. The word straps are shown as being arranged in pairs such that 31, 50 and 32, 51 comprise one pair, 33,52 and 34,53 comprise another pair, etc. It is not necessary that the word straps be arranged in pairs. The word strap pairs can be placed any convenient distance apart, but should be sufficiently far apart to prevent coupling from one pair to an adjacent pair.

Circuit board 30 is preferably a double sided printed circuit board so that innerconnections between word straps and external circuitry can be printed on the opposite side of the circuit. Cross hatched layer 45 represents the circuit printed on the opposite side of board 30. The specific circuit diagram is not critical to an understanding of this invention.

A second circuit board 47 similar to circuit board 30 has placed thereon word straps 50–57 and 60–63. Each of the word straps has a magnetic keeper associated therewith and the assembly may be formed in the same way that layer 46 was placed on circuit board 30. A circuit layer 64 is placed on the opposite side of circuit board 47. The word strap layer comprising word straps 50–57 and 60–63 together with the associated magnetic keepers comprises layer 65 of the multi-layer printed circuit assembly. Circuit boards 30 and 47 are laminated or bonded to tunnel structure 10 by means of ordinary bonding techniques.

FIG. 3 shows the assembly of FIG. 1 placed on an aluminum or epoxy base 70. Circuit layer 45 and circuit board 30 have been removed to better illustrate the arrangement. Components shown in FIG. 1 and 2 have been numbered the same in FIG. 3. Plated wires 11–17 and 20–24 are shown as being connected to contacts 71–77 and 80–84, respectively. These contacts can be placed on the edge of board 70 and are placed sufficiently far apart to permit contacts to be made with external circuitry. Plated wires 11–17 and 20–24 are brought out to the edge of board 70 on the end opposite to contacts 71–77 and 80–84 where they are connected by leads 85 to a similar multi-layer assembly on the opposite side of board 70. Conductors 85 should have a stress loop so that the plated wires can move slightly relative to board 70 so that mechanical stresses are relieved. A spacer 86 can be used to prevent conductors 85 from shorting. Spacer 86 can be a material similar to tunnel structure 10.

Various contacts and selection diodes are shown connected to the word straps in FIG. 3. The connections are shown schematically and would actually be included within layer 45 of FIGS. 1 and 2. The diodes would also be included within layer 45. The contacts and diodes shown in FIG. 3 would actually be connected to the word straps through plated holes through circuit board 30.

FIG. 4 shows a memory stack with four memory layers. The details shown in FIGS. 1–3 are not shown in FIG. 4 but would be present in each memory layer. Center board 70 is shown connected to another center board 87 by means of supports or connecting means illustrated schematically by column 90. Memory layer 91 is mounted on one side of center board 70 while memory layer 92 is mounted on the other side. Memory layer 91 is shown in top view in FIG. 3. Memory layers 93 and 94 are similarly mounted on center board 87. Spacer 86 is shown with plated wire 24 running therethrough and connected by means of flex loop 85 to a plated wire 95 which runs through the spacer 96 and memory layer 92. Contact 84 is also shown. Plated wire 95 is connected to a contact 97 which is connected to a contact 100 on center board 87. Contact 100 is connected to a plated wire 101 which runs through memory layer 93 and a spacer 102. Plated wire 101 is connected by means of a flex loop 103 to a plated wire 104. Plated wire 104 runs through a spacer 105 and memory layer 94 and is connected to contact 106 on center board 87.

FIG. 5 shows a wiring diagram for one wiring arrangement of the plated wires. A block 107 labeled sense amplifier and bit generator is shown connected to leads 110 and 111. The sense amplifier and bit generator can be any conventional circuitry and would in general be part of the memory access circuitry of a digital computer. In the wiring diagram of FIG. 5 the plated wires are operated in pairs. Some of the numbers used in describing FIG. 5 will be the same as those used in FIGS. 3 and 4 for clarity. Lead 110 is connected to contact 84 which is in turn connected to plated wire 24. Stress or flex loop 85 is shown as a terminal connecting plated wire 24 to plated wire 95. Contacts 97 and 100 are shown as a terminal connecting plated wire 95 to plated wire 101. Stress or flex loop 103 is shown as a terminal connecting plated wire 101 to plated wire 104 which is in turn connected to contact 106. Contact 106 is connected to a contact 112 which would be adjacent to contact 106 on center board 87. Contact 112 is connected to a plated wire 113 which would be threaded through memory plate 94 and spacer 105. Plated wire 113 is connected by a stress or flex loop 114 to a plated wire 115 which is threaded through spacer 102 and memory layer 93 and is connected to a contact 116. Contact 116 is connected to a plated wire 117. Contact 116 is actually two contacts one of which is adjacent to contact 100 and the other of which is adjacent to contact 97. Plated wire 117 is threaded through memory layer 92 and spacer 96 and is connected by another stress or flex loop 85 to plated wire 23. Plated wire 23 is connected by contact 83 to conductor 111.

FIG. 6 shows a wiring diagram for word straps. The word straps are connected between a driver 120 and a selection switch 121. Driver 120 and selection switch 121 operating in combination select the particular word strap and provide signals to that word strap. Driver 120 is connected through a diode, which is the same as the diodes shown in FIG. 3, to word strap 31 of FIG. 1. The opposite end of word strap 31 is connected to word strap 50. This connection is made through circuit board 25 using standard multi-layer printed circuit board techniques. The free end of word strap 50 is then connected to word strap 32, the opposite end of which is connected to word strap 51. The free end of word strap 51 is then connected to selection switch 121.

Generally, a memory cell is the intersection of a plated wire with a word strap. Since the word straps 31 and 50 would ordinarily be connected together, a memory cell is defined as the intersection of word straps 31 and 50 with plated wire 24, for example. Every intersection of a pair of word straps with a plated wire would be a memory cell. However, with the wiring diagram as shown in FIGS. 5 and 6 each memory bit is stored in four memory cells. This result is obtained because the plated wires are shorted together by terminals such as 106 and 112 and because two word straps are connected in series. Thus, one memory bit is defined as the intersection of word straps 31 and 50 with plated wires 23 and 24 together with the intersection of plated wires 23 and 24 with word straps 32 and 51. The intersection of plated wires 95 and 117 with corresponding words straps in memory plate 92 would comprise another bit and so forth. It will be evident to those skilled in the art that many other wiring arrangements can be used. Accordingly, the particular wiring arrangement of the word straps and plated wires is not critical to an understanding of this invention.

Those skilled in the art will realize that many modifications of our invention can be made. For example, the flex or stress loops can be eliminated and the plated wires can be bent around the edge of the center boards with the curvature of the plated wire being used for a stress loop. It is also evident that this invention is not limited to memory planes with 12 word straps or 12 plated wires nor is the invention limited to four memory planes in a stack, but any number of plated wires, or straps, or memory planes can be used. Furthermore the specific dimensions used are for purposes of illustration only and are not to be considered limiting. One modification of this invention which can also be used to provide better performance is to place a dummy plated wire on each edge of the memory plane. The characteristics of the plated wire depend somewhat on the interference provided by adjacent plated wires. When there is no plated wire on one side of an operational plated wire, that plated wire will have different characteristics. For example, in FIG. 3 plated wires 11 and 24 have no wires on one side so that they will have different characteristics from the characteristics of the interior wires. Accordingly, it is within the scope of this invention to place dummy wires adjacent to wires 11 and 24 along the edges of the tunnel structure so that all of the operational plated wires will have the same characteristics.

In view of the avbve comments it is evident that we do not wish to be limited by the specific embodiment shown and described nor by the dimensions given but only by the scope of the appended claims.

We claim as our invention:

1. The method of making a memory plane comprising the steps of:

forming evenly spaced circular tunnels in a semi-rigid insulative tunnel substrate;

inserting wires plated with a magnetic material in the tunnels, the relative diameters of the tunnels and wires being such as to provide a loose fit;

forming a multi-layered assembly by one side of providing a coating of magnetically permeable material to portions of a second substrate, affixing a set of conductors into the permeable material and over said portions of the second substrate, affixing conductive material on the opposite side of the second substrate, and, removing portions of the conductive material to form circuitry for interconnecting the conductor set with external circuitry; and, bonding the tunnel substrate containing plated wires between two of said multi-layered assemblies with the conductor sets adjacent to the tunnel substrate and between the tunnel substrate and the magnetically permeable material.

2. The method of claim 1 wherein the step of forming a multi-layered assembly comprises:

placing a layer of magnetic material on one side of a sheet of glass epoxy;

printing copper straps on portions of the magnetic material;

placing a layer of gold over the straps; and, etching away the magnetic material that is not covered by the copper straps.

* * * * *

UNITED STATES PATENT OFFICE
CERTIFICATE OF CORRECTION

Patent No. 3,727,304 Dated April 17, 1973

Inventor(s) JACK L. GRANATO ET AL.

It is certified that error appears in the above-identified patent and that said Letters Patent are hereby corrected as shown below:

Claim 1, line 8, after "by" cancel --one side of--;

line 10, after "of" insert --one side of--;

line 11, cancel "into" and substitute --onto--.

Signed and sealed this 18th day of December 1973.

(SEAL)
Attest:

EDWARD M. FLETCHER, JR.
Attesting Officer

RENE D. TEGTMEYER
Acting Commissioner of Patents